(12) United States Patent
Wach et al.

(10) Patent No.: US 7,652,685 B2
(45) Date of Patent: Jan. 26, 2010

(54) IRIS IMAGE CAPTURE DEVICES AND ASSOCIATED SYSTEMS

(75) Inventors: Hans Brandon Wach, Longmont, CO (US); Ramkumar Narayanswamy, Boulder, CO (US); Paulo E. X. Silveira, Boulder, CO (US); Robert H. Cormack, Boulder, CO (US)

(73) Assignee: OmniVision CDM Optics, Inc., Boulder, CO (US)

( * ) Notice: Subject to any disclaimer, the term of this patent is extended or adjusted under 35 U.S.C. 154(b) by 800 days.

(21) Appl. No.: 11/225,753

(22) Filed: Sep. 13, 2005

(65) Prior Publication Data

US 2006/0098097 A1    May 11, 2006

Related U.S. Application Data

(60) Provisional application No. 60/609,445, filed on Sep. 13, 2004.

(51) Int. Cl.
*H04N 9/47*    (2006.01)
*H04N 7/18*    (2006.01)
*G06K 9/00*    (2006.01)

(52) U.S. Cl. .................................. 348/78; 382/117
(58) Field of Classification Search .................. 348/78; 382/117; 398/118, 119
See application file for complete search history.

(56) References Cited

U.S. PATENT DOCUMENTS

| | | | |
|---|---|---|---|
| 5,291,560 A | 3/1994 | Daugman | |
| 5,748,371 A | 5/1998 | Cathey, Jr. et al. | |
| 5,872,834 A | 2/1999 | Teitelbaum | |
| 5,977,535 A | 11/1999 | Rostoker | |
| 6,154,879 A * | 11/2000 | Pare et al. | 705/35 |
| 6,433,818 B1 | 8/2002 | Steinberg | |
| 6,525,302 B2 | 2/2003 | Dowski, Jr. et al. | |
| 6,532,298 B1 * | 3/2003 | Cambier et al. | 382/117 |
| 6,842,297 B2 | 1/2005 | Dowski, Jr. | |
| 6,873,733 B2 | 3/2005 | Dowski, Jr. | |
| 6,911,638 B2 | 6/2005 | Dowski, Jr. et al. | |
| 6,940,649 B2 | 9/2005 | Dowski, Jr. | |
| 7,113,203 B1 * | 9/2006 | Wu et al. | 348/207.99 |

(Continued)

FOREIGN PATENT DOCUMENTS

GB    2362249    11/2001

(Continued)

OTHER PUBLICATIONS

European Application No. EP 06851443, Examination Report, Jun. 3, 2008, 3 pages.

(Continued)

*Primary Examiner*—Sinh Tran
*Assistant Examiner*—Albert H Cutler
(74) *Attorney, Agent, or Firm*—Lathrop & Gage LLP (57) ABSTRACT

An iris image capture device includes an optical arrangement that utilizes Wavefront Coding phase modifications to produce an optical image of a user iris and a detector for detecting the optical iris image and for converting the optical iris image into an electronic data signal. The iris image capture device also includes an image processor configured for processing the electronic data signal from the detector to reverse the Wavefront Coding phase modifications and to produce an electronic iris image of the user iris.

23 Claims, 7 Drawing Sheets

U.S. PATENT DOCUMENTS

| | | | |
|---|---|---|---|
| 7,199,348 | B2 | 4/2007 | Olsen et al. |
| 7,365,917 | B2 | 4/2008 | Zalevsky |
| 7,576,791 | B2 * | 8/2009 | Sonstroem ............... 348/335 |
| 2003/0127584 | A1 | 7/2003 | Dowski et al. |
| 2003/0169944 | A1 * | 9/2003 | Dowski et al. ............. 382/279 |
| 2003/0174211 | A1 | 9/2003 | Imaoka et al. |
| 2004/0190762 | A1 | 9/2004 | Dowski, Jr. et al. |
| 2005/0204329 | A1 | 9/2005 | Pauca et al. |
| 2007/0091486 | A1 | 4/2007 | Dowski, Jr. et al. |
| 2007/0102622 | A1 | 5/2007 | Olsen et al. |
| 2007/0122049 | A1 | 5/2007 | Dowski, Jr. et al. |
| 2008/0198482 | A1 | 8/2008 | Zalevsky |
| 2008/0284980 | A1 * | 11/2008 | Skogo et al. .............. 351/210 |

FOREIGN PATENT DOCUMENTS

| | | |
|---|---|---|
| GB | 2362249 A | 11/2001 |
| JP | 2000307715 | 11/2000 |
| JP | 2001333171 | 11/2001 |
| JP | 2003110695 | 4/2003 |
| JP | 2003284141 | 10/2003 |
| JP | 2005063077 | 3/2005 |
| WO | WO 01/20561 A | 3/2001 |
| WO | WO 03/007538 A | 1/2003 |
| WO | WO 2004/090581 A2 | 10/2004 |

OTHER PUBLICATIONS

European Application No. EP 06851443, Reply to Examination Report, Dec. 15, 2008, 10 pages.
Application No. PCT/US05/32799, International Search Report & Written Opinion, Dec. 12, 2006, 8 pages.
Application No. PCT/US05/32799, International Preliminary Report on Patentability, Mar. 13, 2007, 6 pages.
Application No. PCT/US06/36556, International Search Report & Written Opinion, Feb. 29, 2008, 12 pages.
Application No. PCT/US06/36556, International Preliminary Report on Patentability, Mar. 26, 2008, 9 pages.
Dowski, E.R., et al.: "Wavefront Coding: A Modern Method Of Achieving High Performance and/or Low Cost Imaging Systems," Proceedings of the SPIE, SPIE, Bellingham, VA, vol. 3779, pp. 137-145, Jul. 1999.
Van Der Gracht, J., et al.: "Iris Recognition With Enhanced Depth-Of-Field Image Acquisition," Visual Information Processing XIII Apr. 15-16, 2004, Orlando, Florida, Proceedings Of the SPIE, The International Society For Optical Engineering vol. 5438, No. 1, pp. 120-129, Jul. 2004.
Bagheri, S., et al., "Design and optimization of the cubic-phase pupil for the extension of the depth of field of task-based imaging systems", Proc. of SPIE vol. 6311, 2006, 10 pages.
Ben-Eliezer, E., et al., "Experimental realization of an imaging system with an extended depth of field", Applied Optics, vol. 44, No. 14, May 10, 2005, pp. 2792-2798.
Daugman, J., "Iris Recognition", American Scientist, vol. 89, Jul.-Aug. 2001, pp. 326-333.
Daugman, J., "Statistical Richness of Visual Phase Information: Update on Recognizing Persons by Iris Patterns", Int'l Journal of Computer Vision 45(1), 25-38, 2001.
Daugman, J.G., "High Confidence Visual Recognition of Persons by a Test of Statistical Independence" IEEE Trans. on Pattern Analysis and Machine Intelligence, vol. 15, No. 11, Nov. 1993, pp. 1148-1161.
Guo, G., "Face Expression, And Iris Recognition Using Learning Based Approaches", University of Madison-Wisconsin, 2006, 129 pages.
Jain, A.K., et al., "A Touch of Money", IEEE Spectrum, vol. 43, Issue 7, Jul. 2006, pp. 22-27.
Johnson et al., "Computational Imaging Design Tools and Methods", 2004, Proc. of SPIE vol. 5524, pp. 284-294.
Matey, J.R., et al., "Iris on the Move: Acquisition of Images for Iris Recognition in Less Constrained Environments", Proceedings of the IEEE, vol. 94, No. 11, Nov. 2006, pp. 1936-1947.
Narayanswamy R. et al., "Extending the imaging volume for biometric iris recognition", Appl. Op., vol. 44, No. 5, Feb. 10, 2005; pp. 701-712.
Narayanswamy, R. et al., "Applications of Wavefront Coded Imaging", IS&T /SPIE's Electronic Imaging 2004, San Jose, CA, 22 pages.
Narayanswamy, R. et al., "Applications of Wavefront Coded Imaging", Computational Imaging II 2004, Proc.of SPIE-IS&T Electronic Imaging, SPIE vol. 5299, pp. 163-174.
Narayanswamy, R. et al., "Iris Recognition at a Distance with Expanded Imaging Volume" Biometric Technology for Human Identification III, SPIE vol. 6202, 12 pages, 2006.
Narayanswamy, R., et al., "Extended depth-of-field iris recognition system for a workstation Environment", 2005, Proc. of SPIE vol. 5779, pp. 41-50.
Plemmons, R. et al., "Computational Imaging Systems for Iris Recognition", 2004, Proc. of SPIE vol. 5559, pp. 346-357.
Silveira, P, et al., "Signal-to-noise analysis of task-based imaging systems with defocus", Applied Optics, vol. 45, No. 13, May 1, 2006, pp. 2924-2934.
Van Den Berg, "Wavefront Coding Keeps a Focus on Applications", Opto & Laser Europe, Oct. 2003, 4 pages.

* cited by examiner

IRIS IMAGE CAPTURE DEVICES AND ASSOCIATED SYSTEMS

CROSS-REFERENCE TO RELATED APPLICATIONS

The present application claims priority to U.S. Provisional Application Ser. No. 60/609,445 filed on Sep. 13, 2004, which is hereby incorporated by reference in its entirety. The following U.S. Patents are also incorporated by reference in their entireties: U.S. Pat. No. 5,748,371, entitled Extended Depth of Field Optical Systems to Cathey et al., U.S. Pat. No. 6,525,302, entitled Wavefront coding phase contrast imaging systems to Dowski, Jr., et al., U.S. Pat. No. 6,783,733, entitled Combined wavefront coding and amplitude contrast imaging systems to Dowski, Jr., U.S. Pat. No. 6,842,297, entitled Wavefront coding optics to Dowski, Jr., U.S. Pat. No. 6,911,638, entitled Wavefront coding zoom lens imaging systems to Dowski, Jr., et al. and U.S. Pat. No. 6,940,649, entitled Wavefront coded imaging systems to Dowski, Jr.

BACKGROUND

The cell phone is becoming a necessity in countries around the world. Common cell phone features include address books, day timers, clocks, answering machines and games. More recently, cell phones allow connection to the World Wide Web, email, text messaging and even making purchase transactional payments.

A cell phone also commonly employs a digital camera (a "camera phone"). Images taken by the camera phone are not, generally, for professional purposes but are, instead, taken for fun. Some of the more useful applications of the camera phone include the capture of a map or address from an advertisement or phonebook, and the capture of information from a new acquaintance's business card, for example.

Other new cell phone features are under development. For example, credit card companies seek to make plastic credit cards obsolete. Instead, a cell phone will store credit card information that is used to complete purchase transactions by an infrared (IR) or radio (e.g., BLUETOOTH®) communication link. Though convenient, this system can lead to significant monetary damage if the cell phone is misappropriated by persons who make unauthorized purchases.

Iris recognition technology is gaining acceptance in the biometrics industry. An iris is a unique feature of each human being; it may therefore be used to distinguish one person from another. An iris remains stable over almost the entire human lifetime, and, as an internal organ that is externally visible, it is both easily accessible and well protected from the environment. The variability in iris texture from one person to another is so great that it is virtually impossible for any two people to have the same pattern. By storing iris patterns in a database, for example, an iris image can be scored against each stored iris pattern; the score indicating the probability of a match between the image and the stored pattern.

Iris recognition technology may be combined with the digital camera in a cell phone to provide user identification and transactional security. Accordingly, credit card information stored on the cell phone may only be accessed after the user takes an image of his iris; the iris image is confirmed in the cell phone by matching the image to previously stored iris image information. Iris information can be stored in a physically separate card or stored within the cell phone. In addition, the cell phone may be locked such that, when the cell phone is turned on, the user must image his or her iris to match one or more previously stored iris signatures of users allowed to use the phone or the credit card information.

An iris recognition system may also be incorporated into a conventional digital still or video camera such that, if a feature such as "recognition required" is turned on, then the camera will not operate until the iris of an authorized user is recognized. Such a feature deters theft of the cell phone and of vital information stored within the device, especially if the camera is marked as so protected. Similarly, these security features may also be incorporated into personal digital assistants (PDAs) that include a digital camera.

One problem with iris recognition involves the user interface. An iris image must be of sufficient resolution to resolve texture within the iris. In digital cameras with detectors that have few pixels, the field of view is so small that significant skill is needed to align an eye with the camera. Good iris imaging also depends upon controlled illumination and, obviously, a willing subject. In certain iris imaging systems, the digital camera has zoom and focusing capabilities to capture the iris image with sufficient clarity and resolution. However, these zoom and focus capabilities increase cost and size of the digital camera; increased size being a particular disadvantage for use within a cell phone or PDA.

Figure 1:
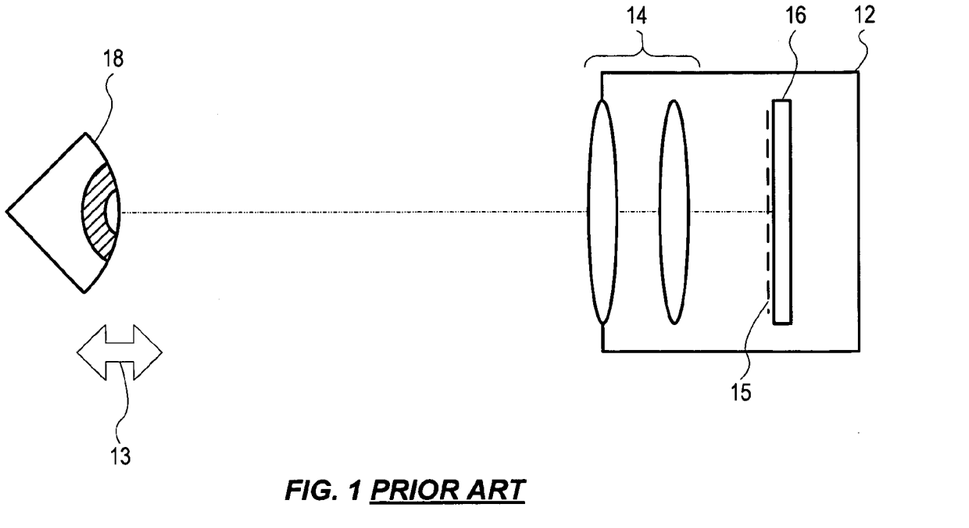
FIG. 1 is a diagrammatic illustration of a prior art imaging device with traditional optics.

Turning now to the drawings, wherein like components are indicated by like reference numbers throughout the various figures, attention is immediately directed to FIG. 1 illustrating a prior art imaging device 12 that has traditional optics 14 and a detector 16. Imaging device 12 is, for example, a digital camera. Imaging device 12 is shown imaging an iris of an eye 18. Traditional optics 14 form a usable image 15 of eye 18 only when eye 18 is within a depth of field 13 of optics 14. Thus, the depth of recognition of imaging device 12 is very small, making imaging device 12 difficult to use.

Figure 2:
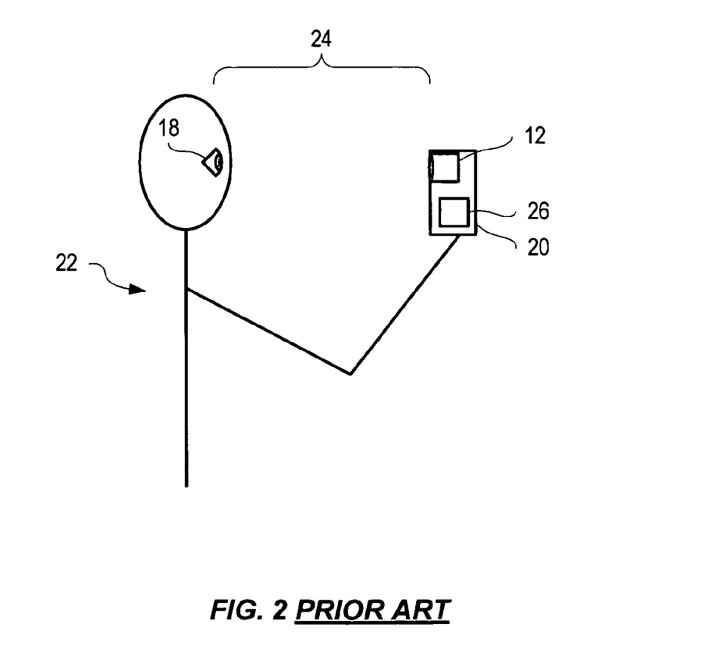
FIG. 2 is a diagrammatic illustration of the operation of the prior art imaging device of FIG. 1, shown here to illustrate how a user may hold the imaging device at a particular distance away from the eye in order to capture an image of the user iris.

FIG. 2 illustrates operation of imaging device 12 of FIG. 1 installed in a camera phone 20. A user 22 holds camera phone 20 at a precise distance from her eye 18 (i.e., such that eye 18 is within depth of field 13 of imaging device 12) to ensure that a good image is captured by imaging device 12. Camera phone 20 may, for example, also include iris recognition processor 26, such that camera phone 20 is not operational (i.e., locked) until iris recognition processor 26 validates a captured iris image of eye 18. Iris recognition processor 26 may store one or more iris patterns of authorized users of camera phone 20, such that the captured iris image is validated against stored iris patterns. A cell phone service provider may store these iris patterns remotely for added security. The cell phone service provider may also store the iris patterns of individuals who attempted to access the device, thus providing an added deterrent to theft. Iris recognition processor 26 creates an iris pattern from the captured iris image and sends this iris pattern to cell phone service provider for validation. If the iris pattern matches a stored pattern, as determined by either recognition processor 26 or the cell phone service provider, camera phone 20 is unlocked.

One method for facilitating the capture of a usable iris image is to determine when the camera is at the correct distance from the eye by using a distance-determining sensor on the digital camera. The distance-determining sensor may include a tone indication or a light to indicate when the eye is at the correct distance from the camera. However, the distance determining sensor adds complexity, size and cost to the camera phone. To make digital camera units more affordable, inexpensive lenses are often used. However, the inexpensive lenses may result in reduced imaging quality such that effective iris image capture may be difficult.

SUMMARY OF THE INVENTION

The present disclosure provides portable electronic devices and systems with features for security, convenience and entertainment, to reduce or eliminate the foregoing problems. As will be described in more detail hereinafter, there is disclosed herein an image capture device including an optical arrangement that utilizes Wavefront Coding phase modifications to produce an optical iris image of a user iris and a detector for detecting the optical iris image and for converting the optical iris image into an electronic data signal. The image capture device also includes an image processor configured for processing the electronic data signal from the detector to reverse the Wavefront Coding phase modifications to produce an electronic iris image of the user iris.

In one embodiment, the iris image capture device exhibits a depth of field, and the Wavefront Coding and image processor cooperate to increase the depth of field of the device over and above the depth of field that would be exhibited by the device if Wavefront Coding were not utilized.

In another embodiment, the iris image capture device is included in a camera phone system, and the camera phone system is configured to be non-operational until the electronic iris image is matched to an iris pattern of an authorized user of the camera phone system.

In still another embodiment, there is disclosed herein a device including an optical arrangement that utilizes Wavefront Coding phase modifications to produce an optical iris image of a user iris. The image capture device further includes an integrated chip, which in turn includes a detector for detecting the optical iris image and for converting the optical iris image into an electronic data signal, and an image processor configured for receiving the electronic data signal from the detector and for processing the electronic data signal to produce an electronic iris image of the user iris.

In another embodiment, the image processor of the integrated chip is further configured to reverse the Wavefront Coding phase modifications in producing the electronic iris image.

In one embodiment, the image capture device is incorporated within an electronic system having at least one feature, and the at least one feature of the electronic system is configured to be non-operational until the electronic iris image, produced by the image processor, is matched to an iris pattern of an authorized user of the electronic system.

In another embodiment, the iris pattern of the authorized user is stored within the integrated chip, and the image processor is further configured for comparing the electronic iris image to the iris pattern stored within the integrated chip.

DETAILED DESCRIPTION

The capture of an optical iris image is facilitated by increasing the depth of field of the imaging device, such as a camera phone, through Wavefront Coding, such that the user has greater latitude in positioning the imaging device relative to their eye. Wavefront Coding techniques are described, for example, in U.S. Pat. No. 5,748,371 (hereinafter, the "'371 patent"), U.S. Pat. No. 6,525,302 (hereinafter, the "'302 patent"), U.S. Pat. No. 6,783,733 (hereinafter, the "'733 patent"), U.S. Pat. No. 6,842,297 (hereinafter, the "'297 patent"), U.S. Pat. No. 6,911,638 (hereinafter, the "'638 patent"), and U.S. Pat. No. 6,940,649 (hereinafter, the "'649 patent"), which are incorporated herein by reference in their entireties. The addition of Wavefront Coding techniques to a particular imaging system may increase the depth of field by a factor of ten or more such that the distance requirement between the camera and the eye is relaxed.

In addition to increasing the depth of field of an iris image capture system, Wavefront Coding may also make such a system invariant to other focus-like aberrations, thereby creating additional degrees of freedom in the optical design of the system. For example, simpler and cheaper lenses may be used without compromising the image quality. Also, the inclusion of Wavefront Coding techniques allows flexibility in the location of the iris in a plane perpendicular to the depth of field direction so as to increase the effective field of view of the system.

Figure 3:
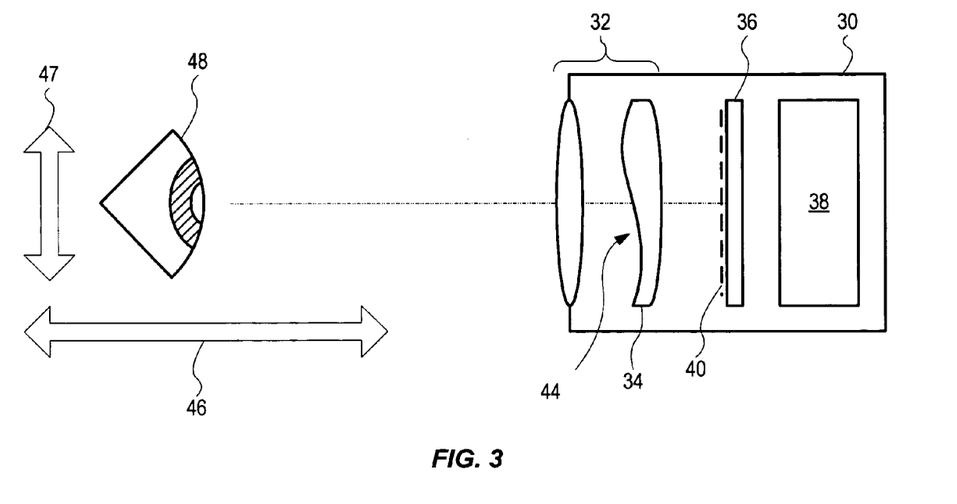
FIG. 3 is a diagrammatic illustration of an iris image capture device designed in accordance with the present disclosure, shown here to illustrate the increased flexibility in positioning of the user eye with respect to the imaging device.

FIG. 3 shows an iris image capture device 30. Iris image capture device 30 has optics 32 that include a Wavefront Coding element 34; device 30 also has a detector 36 and an image processor 38. The Wavefront Coding functionality in Wavefront Coding element 34 may include, for instance, phase modifications applied at a surface 44 of Wavefront Coding element 34. Detector 36 captures an optical iris image 40 of an eye 48 to an electronic signal. Image processor 38 operates to decode the electronic signal (e.g., by reversing the phase modifications applied by Wavefront Coding element 34) to create an electronic iris image that may be further processed or stored. Wavefront Coding element 36 and image processor 38 cooperate to provide an increased depth of field (indicated by a double-headed arrow 46) as compared to depth of field 13 of prior art imaging device 12, as shown in FIG. 1, thereby increasing a "depth of recognition" of iris image capture device 30 over that of imaging device 12. Additionally, Wavefront Coding element 34 allows flexibility in field of view (indicated by another double-headed arrow 47).

Figure 4:
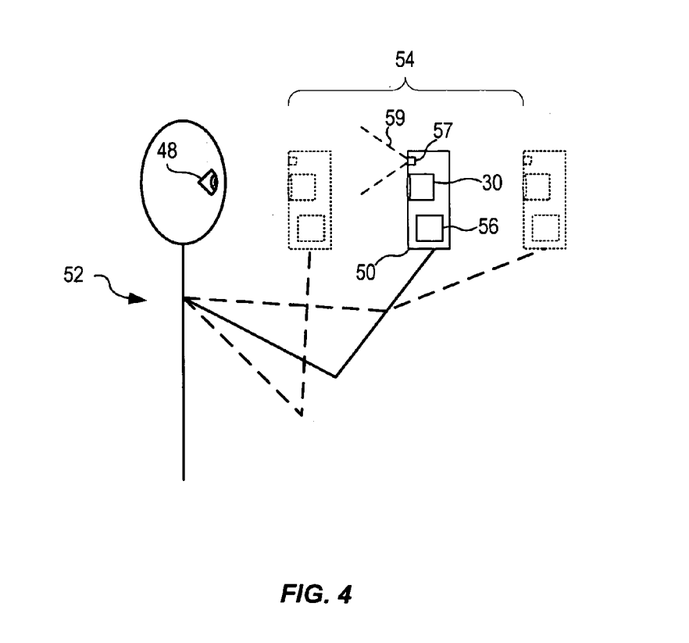
FIG. 4 is a diagrammatic illustration of the operation of the iris image capture device of FIG. 3.

FIG. 4 shows an example of operation of iris image capture device 30 of FIG. 3, incorporated into a hand-held system 50. Hand-held system 50 is, for example, a camera phone system, a personal digital assistant (PDA) system, a photographic system or another system that includes an imaging device (e.g., a system that includes a digital camera). A user 52 uses hand-held system 50 to image the iris of eye 48. Since iris image capture device 30 (utilizing Wavefront Coding element 34, FIG. 3) has a large depth of field, hand-held system 50 captures an optical iris image 40 of eye 48 that is in focus over an extended positional range 54 that is larger than a corresponding range would be without iris image capture device 30. Through the use of iris image capture device 30, hand-held system 50 is easier to use (since less positioning precision is required) than camera phone 20 of FIG. 2.

Hand-held system 50 may, for instance, also include an iris recognition processor 56. In one example of operation, hand-held system 50 may not be operational (e.g., hand-held system 50 is locked) until iris recognition processor 56 validates a captured iris image of user 52. In one embodiment, iris recognition processor 56 stores one or more iris patterns of authorized users of hand-held system 50 and validates the captured iris image against these stored iris patterns. In another embodiment, a remote entity (e.g., an identification service, a bank, a cell phone service provider, etc.) is used to match the captured iris image to that of an authorized user. In one example of remote entity authorization, hand-held system 50 is a camera phone system, and a service provider of the camera phone system stores iris patterns of authorized users of the camera phone system. Iris recognition processor 56 creates an iris pattern from the captured iris image and sends this iris pattern to a camera phone service provider for authentication. If the iris pattern matches one of the stored patterns, as determined by either iris recognition processor 56 or the camera phone service provider, the camera phone system (i.e., hand-held system 50) is unlocked and made operational.

In one embodiment, iris recognition processor 56 and image processor 38 may be combined to share a common processing unit and memory.

Note that iris image capture device 30 may be used for capturing other images; for example, it may operate as a digital camera to capture images of objects and people with increased depth of field.

Figure 5:
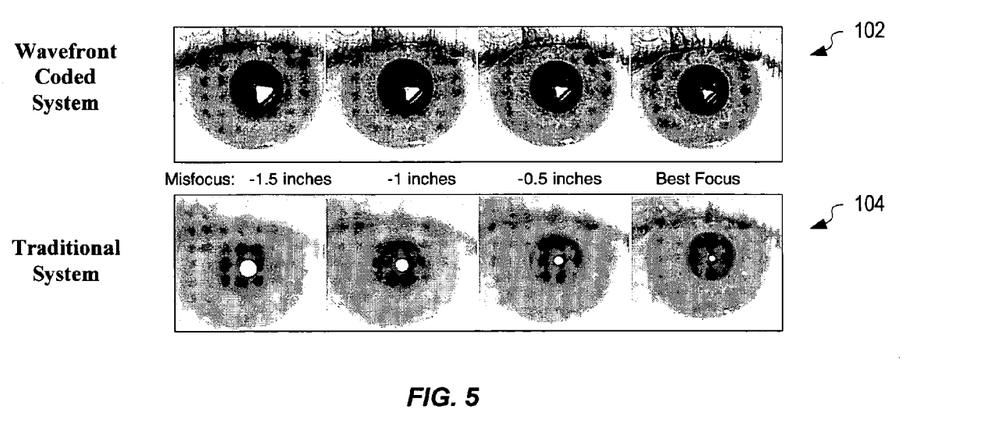
FIG. 5 is a series of exemplary images of the iris as captured by the imaging device of the prior art and by the iris image capture device of FIG. 3, shown here to compare the image quality between the images captured by the prior art device and the device of the present disclosure.

FIG. 5 shows two rows of iris images. The top row 102 shows four iris images captured by an iris image capture device designed in accordance with the present disclosure, such as iris image capture device 30 of FIG. 3. The bottom row 104 shows four iris images captured with a traditional imaging device, such as that exemplified by imaging device 12 of FIG. 1. Optical parameters of the two systems were the same except for the utilization of Wavefront Coding in the system that captured the iris images of top row 102. The right-most image of each row was captured at the "best focus" distance from the eye. Each subsequent image to the left was captured with an increasing distance (in inches) of misfocus, as shown. As can be seen in FIG. 5, the effect of misfocus on the amount of texture and detail of the iris that may be captured is significant. It is thus apparent that the iris image capture device of the present disclosure, with Wavefront Coding, captures images with more texture and detail over the range of misfocus, as shown in FIG. 5, as compared to the traditional imaging device.

Figure 6:
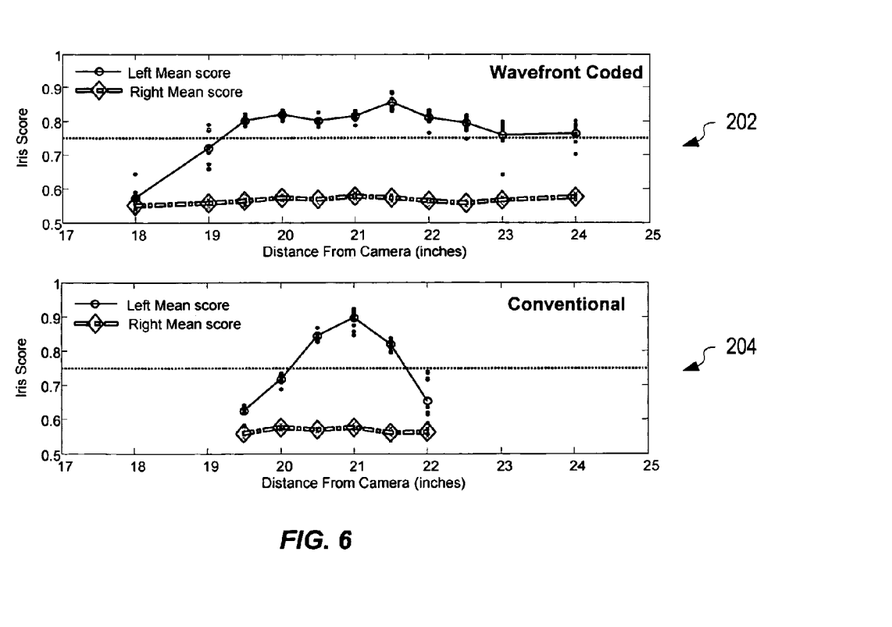
FIG. 6 shows two graphs of normalized iris scores, shown here to illustrate the improvement in normalized iris scores of the iris image capture device of FIG. 3 over the prior art device.

FIG. 6 shows two graphs of normalized iris scores. Iris scores are generated, for example, when matching a captured iris image against a stored iris pattern: the higher the score, the greater the probability of a match. A top graph 202 shows iris image scores obtained from images captured by an imaging device of the present disclosure, such as iris image capture device 30 of FIG. 3; and a bottom graph 204 shows iris image scores from images captured by a traditional imaging device, such as prior art imaging device 12 of FIG. 1. If the required score for a positive iris match is 0.75, as indicated by a dotted horizontal line on each graph, the extended depth of recognition afforded by the imaging device including Wavefront Coding is greater than the depth of recognition of the traditional imaging device.

A system (e.g., a camera phone system) with iris recognition capability and Wavefront Coding technology may thus provide security to such a system without imposing complex user skill and operational requirements. Personal information may be securely stored on the system and accessed only when a match is made to an iris pattern of an authorized user. Consequently, should the system become lost or stolen, its owner may be less concerned, since the camera phone system is inoperable without its owner's eye.

As camera phone manufacturers move to larger format cameras, an increased field of view may be achieved; and Wavefront Coding may serve to simplify camera alignment. As shown in FIG. 4, if supplemental illumination of an iris is required (or desired) for image capture, a small near-infrared (NIR) light emitting diode (LED) 57 may be incorporated into the camera phone, to illuminate user 52 with electromagnetic energy 59. The NIR LED 57 is small and requires very little power. NIR LED 57 may be the same IR source used in an IR communication link, which is commonly incorporated into camera phones. Moreover, human irises commonly present higher contrast when imaged under NIR illumination.

The inclusion of imaging devices in other types of hand-held systems (e.g., PDAs) is on the rise. Use of Wavefront Coding in iris image capture devices (e.g., iris image capture device 30 of FIG. 3) allows iris recognition to be added to such systems without requiring complicated operational procedures and imaging skills.

Since Wavefront Coding and image processing improves image quality, digital camera systems may be further miniaturized without reducing image quality (as usually results when optics are reduced in size) and, therefore, imaging devices may be miniaturized and incorporated into many more systems. Many such systems may benefit from iris recognition to provide security and deter theft.

Further, where a camera phone system includes iris recognition capability and short range communication capabilities, such as an infrared link or a radio link, the camera phone system may also operate as a security system for operations external to the camera phone. In one example, the camera phone system may provide identification (i.e., through iris recognition) for credit card transactions. The camera phone system may identify the user and then communicate with a vendor's system to authorize a financial transaction (e.g., a credit or debit charge to the user's account). In another example, the camera phone system may provide an electronic iris image, captured from the user, to a vendor's transaction system, which may send the electronic iris image to a bank for authentication. In one embodiment, a credit card is encoded with an iris pattern of the account holder. The vendor then matches the iris pattern to an electronic iris image captured by the camera phone system and transmitted to the vendor at the time of the transaction.

In one embodiment, financial information (e.g., a user's bank account information) is stored on the camera phone system such that a financial transaction (e.g., a purchase) may be made without the use of a credit card. The financial information is secure and may only be accessed when authorized by iris recognition of an authorized account user.

Although each of the aforedescribed embodiments have been illustrated with various components having particular respective orientations, it should be understood that the present devices may take on different configurations with the various components being located in different positions and mutual orientations and still remain within the spirit and scope of the present disclosure. Furthermore, suitable equivalents may be used in place of or in addition to the various components. The function and use of such substitute or additional components may be familiar to those skilled in the art and are therefore regarded as falling within the scope of the present disclosure. For example, some or all of the functionality of detector 36 and image processor 38 of imaging device 30, as shown in FIG. 3, may be integrated onto a single chip such that an iris image capture device may be made more compactly.

Figure 7:
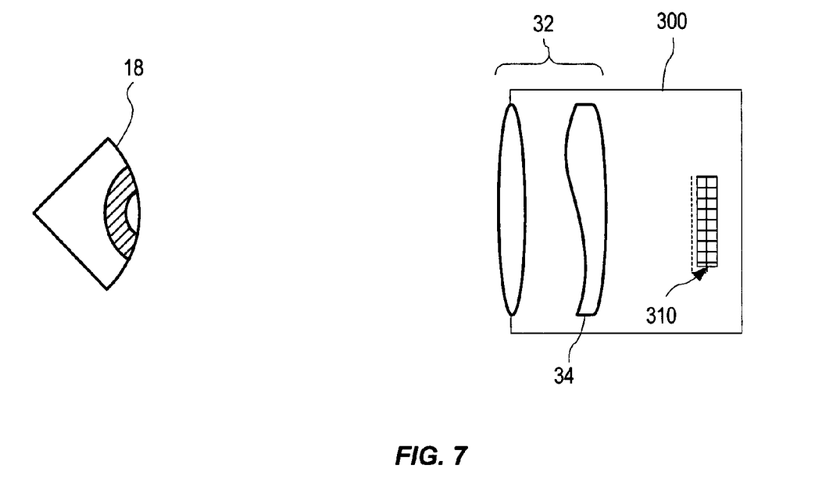
FIG. 7 is a diagrammatic illustration of a compact iris image capture device in accordance with the present disclosure, shown here to illustrate an embodiment wherein the iris image detection and the subsequent processing are performed on a single chip.

An example of such an iris image capture device 300 is shown in FIG. 7. In iris image capture device 300, an integrated chip 310 performs the iris image capture and subsequent processing functionalities.

Figure 8:
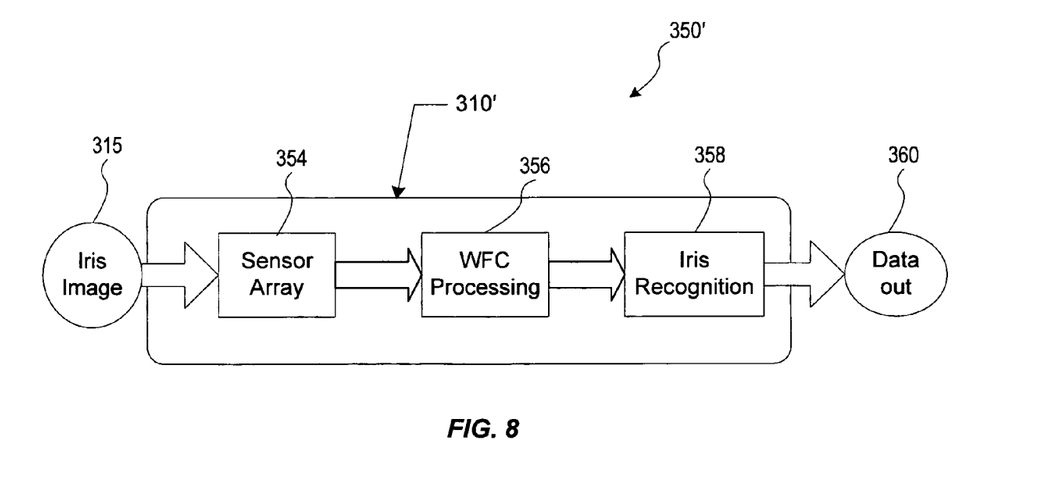
FIG. 8 is a system level diagram for one embodiment of the single chip of FIG. 7.

A system diagram 350' in FIG. 8 shows one example of the functionalities that may be included on the integrated chip in compact iris image capture device 300. FIG. 8 shows an integrated chip 310' that includes a sensor array 354 configured to capture optical iris image 315 to an electronic signal. Sensor array 354 may, for instance, perform the image capture functionality of detector 36 as shown in FIG. 3. Sensor array 354 then sends the electronic signal to a Wavefront Coding ("WFC") processing unit 356, which processes the electronic signal in accordance with the Wavefront Coding procedure as described, for instance, in the '371, '302, '733, '297, '638 and '649 patents, to form an electronic iris image. The electronic iris image is directed to an iris recognition unit 358, also located on integrated chip 310', where iris recognition functionality, such as user recognition and authorization, is performed. Data from iris recognition unit 358 may be directed out of integrated chip 310' as data out 360, which may be used, for example, to "unlock" the system in which compact iris image capture device 300 is housed.

Figure 9:
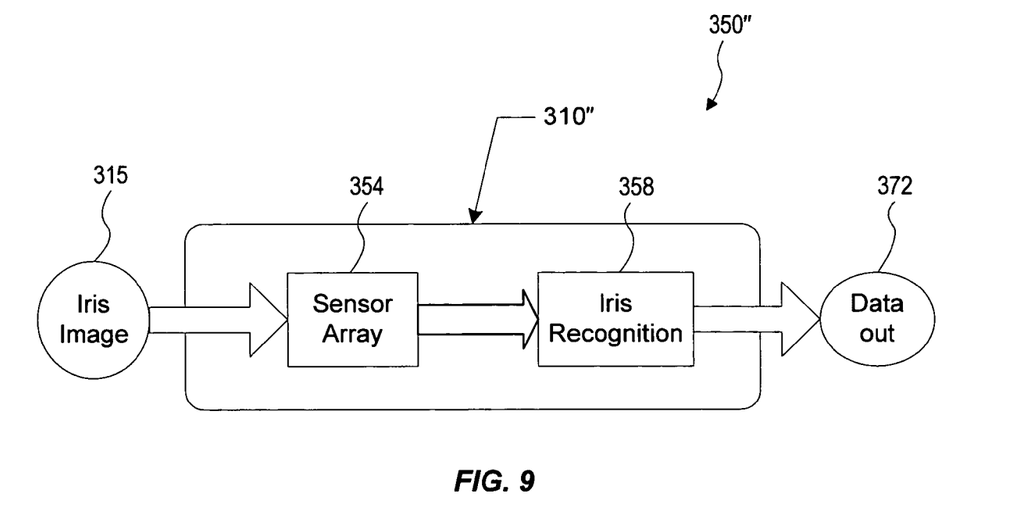
FIG. 9 is a system level diagram for an alternative embodiment of the single chip of FIG. 7.

FIG. 9 shows an alternative processing flow that may take place on an integrated chip. A system diagram 350" in FIG. 9 shows an alternative, integrated chip 310", which also captures optical iris image 315 via sensor array 354. Unlike integrated chip 310', however, integrated chip 310" does not include Wavefront Coding processing functionality. It has been found that, in cases where a visual confirmation or record of an iris image is not required, it is not necessary to reverse the Wavefront Coding effect of Wavefront Coding element 34 in order to perform the iris recognition processing. That is, for instance, an iris pattern database may contain iris patterns that are not processed to remove Wavefront Coding effects of a known Wavefront Coding element, and comparison to these iris patterns for iris recognition purposes may be performed without reversing the Wavefront Coding phase modifications in captured optical iris image 315. Therefore, it is not necessary for integrated chip 350" to include a Wavefront Coding (WFC) processing unit in order for compact iris image capture device 300 to function as an iris recognition unit.

Figure 10:
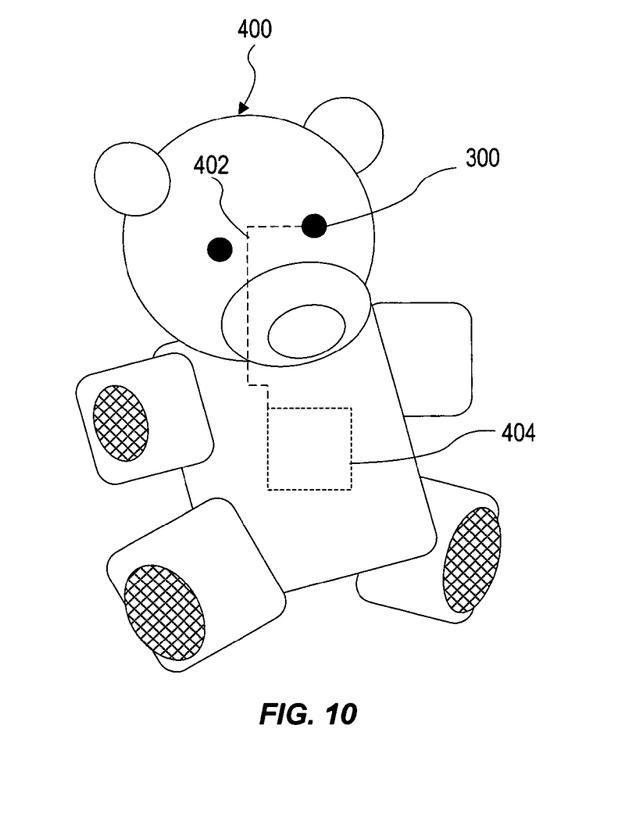
FIG. 10 is a diagrammatic illustration of a toy including the compact iris image capture device of FIG. 7.

Since integration of the various functionalities onto the integrated chip allows a reduction in size for the compact iris image capture device 300, it is possible to integrate compact iris image capture device 300 into a variety of electronic devices. For example, as shown in FIG. 10, device 300 may be incorporated into a toy 400. Device 300 may connect, for instance, by a connection 402 to a processing unit 404 located within toy 400. Processing unit 404 may include, for example, customizable data storage and an audio speaker (not shown). When device 300 recognizes a particular user of toy 400 (e.g., by matching an electronic iris image to a stored iris pattern of the particular user) processing unit 404 produces an audio signal as a customized greeting including that user's name (e.g., "Hello, Jimmy! How are you today?") or a message recorded by another user.

Figure 11:
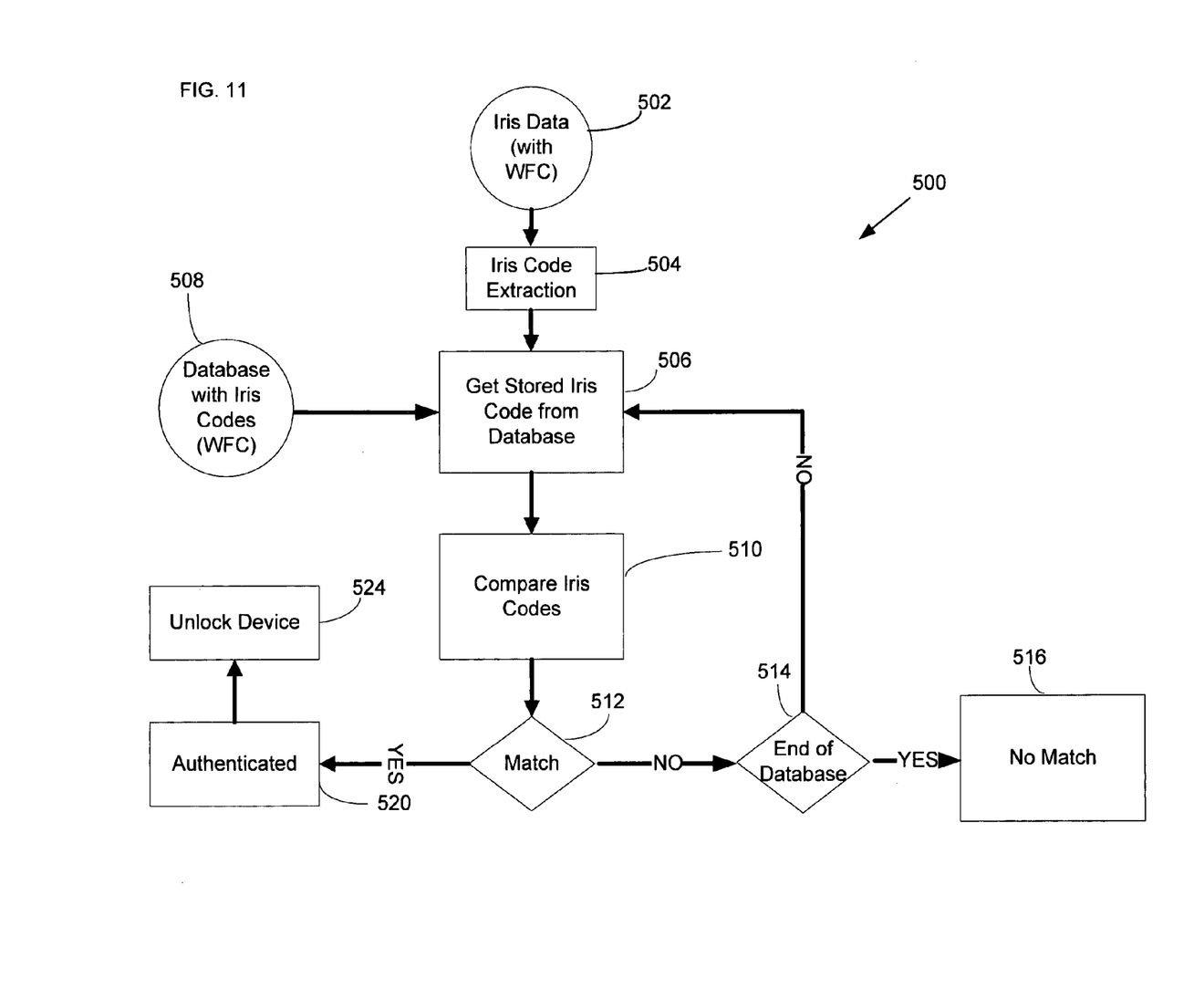
FIG. 11 is a flow chart diagram showing a processing flow for an authentication procedure to take place, for example, in the single chip embodiment shown in FIG. 8.

FIG. 11 shows a flow chart diagram illustrating a processing flow 500 that may be implemented on, for example, integrated chip 310'. Processing flow 500 is initiated by the input of iris data 502, with Wavefront Coding in the case of integrated chip 310'. Iris data 502 is, for instance, optical iris image 315 of FIG. 8. Iris data 502 is input into an iris code extraction step 504, which isolates the code within iris data 502 specific to the iris recognition procedure. A step 506 then retrieves database iris codes 508, with Wavefront Coding, for comparison with the iris code extracted in step 504. A comparison is performed in a step 510. A decision 512 determines whether or not there is a match between the extracted iris code and a database iris code. If the answer to decision 512 is "NO", then another decision 514 is made to determine whether the end of the iris code database has been reached or if there are more iris codes stored in the database. If the answer to decision 514 is "NO", then the process returns to step 506 to retrieve additional database iris codes for comparison. If the answer to decision 514 is "YES", then processing flow 500 proceeds to a step 516 which indicates that the authentication process has failed. If the answer to decision 512 is "YES" the iris code extracted from the input iris data matches a database iris code, then a step 520 indicates that the user providing the initial, iris data 502 has been authenticated. A step 524 follows to, for example, unlock the device being used to provide device access to the authenticated user.

Figure 12:
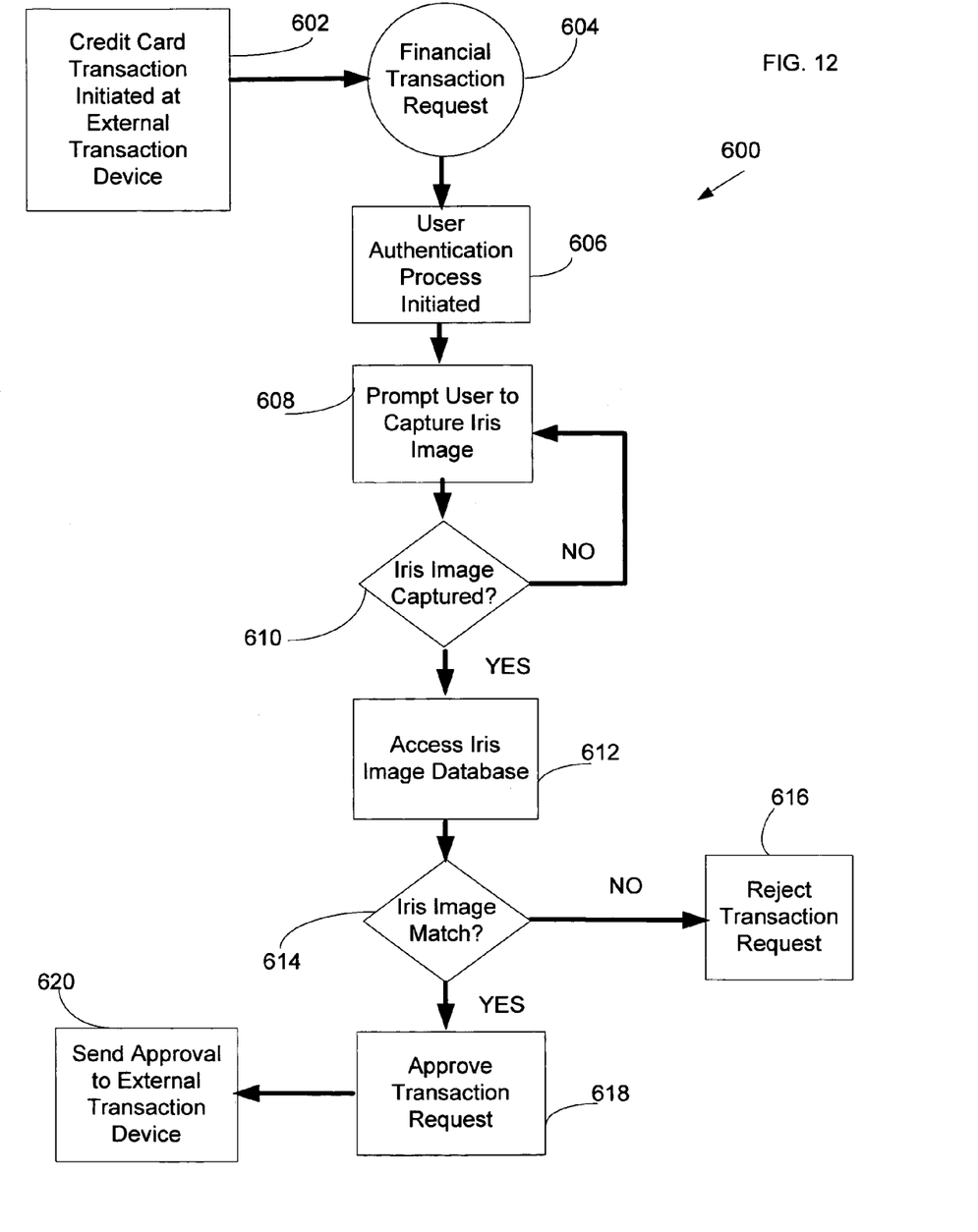
FIG. 12 is a flow chart diagram showing a processing flow for a financial transaction authentication procedure to take place, for example, in a single chip embodiment shown in FIG. 8.

FIG. 12 shows a flow chart diagram illustrating a transaction authentication process 600 for authorizing a financial transaction, such as credit card transactions, by interaction of an iris image capture device with an external transaction device. The external transaction device may be, for example, a credit card reader. Process 600 begins when a financial transaction, such as a credit card transaction, is initiated at an external transaction device in a step 602. The external transaction device then sends a financial transaction request 604, which results in the initiation of a user authentication process at the iris image capture device in a step 606. The user is then prompted to capture an iris image at the iris image capture device in a step 608. A decision 610 determines whether a useable iris image has been captured by the iris image capture device. If the answer to decision 610 is "NO", then the user is returned to step 608, where the user is again prompted to capture an iris image. If the answer to decision 610 is "YES", then an iris image database is accessed in a step 612 to retrieve stored iris images of authorized users. The iris image database may be, for example, stored in the credit card, which initiated the transaction, in the image capture device, in the external transaction device, or at a central database at a financial institution. Retrieval step 612 may also include decoding of the iris image from the database in cases where the database sends the image in an encrypted form. A comparison between the captured iris image and the database iris image is made, and a decision 614 determines whether there is a match between the captured iris image and the database iris image. If the answer to decision 614 is "NO", then a step 616 to reject the transaction request follows. If the answer to decision 614 is "YES", then the transaction request is approved in a step 618, and the approval is subsequently sent back to the external transaction device in a step 620. Step 620 may also include encryption of the approval prior to sending. In this way, external transaction device and the iris image capture device may be configured to interact for authentication of financial transactions.

An additional consideration is the security of the data transmitted during the iris recognition process. For example, an electronic signal sent from the iris image capture device or an external identity validation system may potentially be detected and/or copied by an eavesdropping party. As extra protection against this potential security breach, iris data corresponding to the captured iris image, or the validation signal back to, for example, the camera phone system, may be encrypted. As a result, if the iris data and/or the validation signal is intercepted, the intercepted information cannot be used to bypass the iris recognition process without the right encryption decoders. For instance, the Wavefront Coding processing may be combined with encryption such that the Wavefront Coding process serves as part of the encryption process.

The same Wavefront Coding optics may use a number a different processing kernels. This processing kernel may be modified, for instance, based on the basis of a number of events. As an example, the same iris images, including Wavefront Coding, may be fed to a number of different iris recognition algorithms. In this way, the iris image may be reconstructed so as to highlight certain features specific to the algorithm used. The WFC processing may also be changed dynamically based on the situational need. For example, in critical applications such as protection of sensitive data from a military opponent, the WFC processing may be modified so as to provide additional security protection compared to the WFC processing that may be used in less crucial applications, such as when iris recognition is used as a login mechanism for an office computer having no classified information. The WFC processing may be modified based on other factors such as illumination levels, size of an iris image database against which the iris image of a person seeking access must be compared, or preceding security events.

Another way in which the WFC element in the iris recognition system of the present disclosure may be employed, in addition to user authentication, is for the identification of the specific equipment being used. For example, a variety of different Wavefront Coding elements may be made available for different iris recognition applications. In this case, each WFC element type may be reserved for use with a specific equipment or manufacturer. For instance, cell phone cameras may be equipped with a type "A" WFC element, while gaming cameras are equipped with a type "B" WFC element, commercial toys may be loaded with a type "C" WFC element, etc. As a result, in addition to user authentication for the various types of equipment, the specific equipment being used may also be identified by analyzing the specific type of WFC element used in the WFC processing of the iris image. An individual WFC element may be endowed with a unique optical signature (such as a unique media access control (MAC) address) such that the specific optical system being used for the iris recognition process may be identified in addition to the user authentication.

Still another consideration is specular reflection in the iris image. Since the human eye is generally a semi-spherical surface, an image of a human iris usually includes specular reflection as part of the image. Specular reflection is generally a function of the point spread function (PSF) of the imaging system. Normally, point spread functions tend to be circular. However, it is recognized that the point spread functions resulting from Wavefront Coding have readily identifiable shapes that are located in the resulting Wavefront Coded image. This property of the WFC point spread function is advantageous in iris recognition applications because the identifiable shape introduced by Wavefront Coding may be utilized to locate the iris in a field of view, thereby increasing the processing throughput and/or simplifying user interaction.

Additionally, the iris image capture device of the present disclosure may be adapted to perform other types of biometric authentication such as, but not limited to, face recognition, gait recognition, and hyper-spectral signatures such as thermo-grams. The Wavefront Coding element may be, for instance, a diffractive element, a refractive element, a holographic element, micro-optics, adaptive optics or a combination thereof. The sensor unit on the integrated chip may be, for example, CMOS, CCD or a micro-bolometer array. The Wavefront Coding and iris recognition processing unit platforms may be, for instance, ASIC, VLSI, FPGA, embedded systems with processor and DPS, application level software, or a combination thereof.

Therefore, the present examples are to be considered as illustrative and not restrictive, and are not limited to the details given herein but may be modified within the scope of the appended claims. The following claims are intended to cover generic and specific features described herein, as well as statements of the scope of the present method and system, which, as a matter of language, might be said to fall therebetween.

What is claimed is:

1. An iris image capture device, comprising:
   an optical arrangement that utilizes Wavefront Coding phase modifications to produce an optical iris image of a user iris in a field of view such that a PSF of the optical iris image has an identifiable shape;
   a detector for detecting the optical iris image and for converting the optical iris image into an electronic data signal; and
   an iris recognition processor that processes the electronic data signal from the detector to identify a position of the user iris by locating the identifiable shape in the field of view.

2. The device of claim 1, wherein the device is included in a camera phone, wherein the camera phone operates as an authentication system for a financial transaction.

3. The device of claim 2, wherein the camera phone communicates with an external transaction device, and the external transaction device matches the electronic iris image to an iris pattern of an authorized user of a credit card, stored on the credit card, to authenticate the financial transaction.

4. The device of claim 1 further comprising an image processor for processing the electronic data signal to reverse the Wavefront Coding phase modifications to produce an electronic iris image of the user iris.

5. The device of claim 4, wherein
   said device exhibits a depth of field; and
   the Wavefront Coding and image processor cooperate to increase the depth of field of the device beyond a depth of field that would be exhibited by the device if Wavefront Coding were not utilized.

6. The device of claim 4, wherein
the device is included in a camera phone system; and
the camera phone system is non-operational until the electronic iris image is matched to an iris pattern of an authorized user of the camera phone system.

7. The device of claim 6, wherein the iris pattern of the authorized user is stored within the camera phone system, and wherein the iris recognition processor compares the electronic iris image to the iris pattern.

8. The device of claim 6, wherein the electronic iris image is wirelessly transferred to a remote entity, the remote entity storing the iris pattern of the authorized user and matching the electronic iris image to the iris pattern.

9. The device of claim 8, wherein the remote entity is an independent authentication service.

10. The device of claim 8, wherein the remote entity is a camera phone service provider.

11. The device of claim 4, wherein
the device is included in a portable system that stores financial information; and
the financial information is inaccessible until the electronic iris image is matched to an iris pattern of an authorized user of the portable system.

12. The device of claim 4, wherein
the device is included in a personal digital assistant (PDA) system, and the PDA system is operational until the electronic iris image is matched to an iris pattern of an authorized user of the PDA system.

13. The device of claim 4, wherein
the device is included in a video camera system, and
the video camera system is non-operational until the electronic iris image is matched to an iris pattern of an authorized user of the video camera system.

14. The device of claim 4, wherein said detector and said processors are integrated onto an electronic chip.

15. The device of claim 4, wherein said image processor encrypts the electronic iris image.

16. The device of claim 4 wherein the image processor and the iris recognition processor share a common processing unit.

17. The device of claim 4 wherein the device is incorporated within an electronic system having at least one feature, and wherein the at least one feature of the electronic system is non-operational until the electronic iris image is matched to an iris pattern of an authorized user of the electronic system.

18. A device comprising:
an optical arrangement that utilizes Wavefront Coding phase modifications to produce an optical iris image of a user iris in a field of view such that a PSF of the optical iris image has an identifiable shape; and
an integrated chip including
a detector for detecting the optical iris image and for converting the optical iris image into an electronic data signal,
an iris recognition processor for processing the electronic data signal from the detector to identify the identifiable shape in the field of view, and
an image processor that receives the electronic data signal from the detector and processes the electronic data signal to produce an electronic iris image of the user iris.

19. The device of claim 18, wherein the image processor reverses the Wavefront Coding phase modifications in producing the electronic iris image.

20. The device of claim 18, wherein the device is incorporated within an electronic system having at least one feature, and wherein the at least one feature of the electronic system is non-operational until the electronic iris image is matched to an iris pattern of an authorized user of the electronic system.

21. The device of claim 20 wherein the iris pattern of the authorized user is stored within the integrated chip, and wherein the iris recognition processor compares the electronic iris image to the iris pattern stored within the integrated chip.

22. The device of claim 21 wherein the integrated chip stores a plurality of iris patterns corresponding to a plurality of authorized users thereon.

23. The device of claim 18 wherein the image processor encrypts the electronic iris image.

* * * * *